(12) United States Patent
Park et al.

(10) Patent No.: US 12,652,467 B2
(45) Date of Patent: Jun. 9, 2026

(54) RANGE FINDER FOR AUTOMATICALLY SETTING CAMERA ZOOM MAGNIFICATION

(71) Applicant: MCNEX CO., LTD., Incheon (KR)

(72) Inventors: Young Bong Park, Seoul (KR); Dong Jin Kim, Namyangju-si (KR); Seung Jun Ro, Goyang-si (KR)

(73) Assignee: MCNEX CO., LTD., Incheon (KR)

( * ) Notice: Subject to any disclaimer, the term of this patent is extended or adjusted under 35 U.S.C. 154(b) by 0 days.

(21) Appl. No.: 18/668,145

(22) Filed: May 18, 2024

(65) Prior Publication Data

US 2024/0397206 A1     Nov. 28, 2024

(30) Foreign Application Priority Data

May 22, 2023     (KR) ......................... 10-2023-0065453

(51) Int. Cl.
| | |
|---|---|
| *H04N 23/69* | (2023.01) |
| *G01S 17/08* | (2006.01) |
| *G01S 17/86* | (2020.01) |
| *G01S 17/89* | (2020.01) |
| *H04N 23/61* | (2023.01) |
| *H04N 23/62* | (2023.01) |
| *H04N 23/63* | (2023.01) |

(52) U.S. Cl.
CPC ............. *H04N 23/69* (2023.01); *G01S 17/08* (2013.01); *G01S 17/86* (2020.01); *G01S 17/89* (2013.01); *H04N 23/61* (2023.01); *H04N 23/62* (2023.01); *H04N 23/632* (2023.01)

(58) Field of Classification Search
CPC ...... H04N 23/632; H04N 23/61; H04N 23/62; H04N 23/69; G01S 17/89; G01S 17/86; G01S 17/08
USPC ...................................................... 348/240.1
See application file for complete search history.

(56) References Cited

U.S. PATENT DOCUMENTS

| | | | | |
|---|---|---|---|---|
| 8,460,111 | B2 * | 6/2013 | Hart ...................... | G06F 1/1626 |
| | | | | 473/131 |
| 10,430,471 | B2 * | 10/2019 | Inoue ............... | G08G 1/096811 |
| 10,653,937 | B2 * | 5/2020 | Lewis ................... | A63B 69/36 |
| 11,745,082 | B2 * | 9/2023 | Lewis ..................... | G01S 17/08 |
| | | | | 356/4.01 |
| 12,007,477 | B2 * | 6/2024 | DeCastro ............... | G01S 19/39 |
| 12,154,251 | B2 * | 11/2024 | Chen ................... | G06V 10/761 |
| 12,412,285 | B2 * | 9/2025 | Lee ........................ | H04N 23/69 |

(Continued)

FOREIGN PATENT DOCUMENTS

| | | |
|---|---|---|
| JP | 2012-28967 A | 2/2012 |
| KR | 10-2009-0028331 A | 3/2009 |

(Continued)

OTHER PUBLICATIONS

Office Action mailed on Jul. 8, 2025 from Korean Patent Office for Application No. 10-2023-0065453.

(Continued)

*Primary Examiner* — Pritham D Prabhakher

(57) ABSTRACT

The present invention relates to a range finder which measures a distance to a target after properly setting a zoom magnification of a camera to aim at the target in a captured preview image on the basis of a distance calculated using the GPS method of a combination of a global positioning system (GPS) method and a laser method.

11 Claims, 4 Drawing Sheets

10

(56) References Cited

U.S. PATENT DOCUMENTS

| | | | | |
|---|---|---|---|---|
| 12,513,276 B2 * | 12/2025 | Aoki | H04N 13/156 | |
| 2009/0324058 A1 * | 12/2009 | Sandage | G06F 18/256 | |
| | | | 382/154 | |
| 2010/0257195 A1 * | 10/2010 | Inoue | G06Q 30/02 | |
| | | | 707/769 | |
| 2014/0215876 A1 * | 8/2014 | Popa-Simil | F41G 3/12 | |
| | | | 42/1.06 | |
| 2014/0240689 A1 * | 8/2014 | Arbouzov | G01S 17/86 | |
| | | | 356/4.01 | |
| 2014/0362255 A1 * | 12/2014 | Kuang | H04N 23/64 | |
| | | | 348/231.5 | |
| 2016/0377379 A1 * | 12/2016 | Roman | F41G 1/473 | |
| | | | 235/404 | |
| 2017/0010359 A1 * | 1/2017 | Jung | G01S 17/08 | |
| 2017/0323458 A1 * | 11/2017 | Lablans | H04N 7/18 | |
| 2017/0354858 A1 * | 12/2017 | Lewis | G01S 17/06 | |
| 2020/0208976 A1 * | 7/2020 | Mitchell | G01S 19/51 | |
| 2020/0238154 A1 * | 7/2020 | Lewis | G01S 17/06 | |
| 2020/0363190 A1 * | 11/2020 | Lee | G01C 9/02 | |
| 2022/0345680 A1 * | 10/2022 | Aoki | H04N 23/633 | |
| 2023/0056332 A1 * | 2/2023 | Chen | G06V 10/761 | |
| 2023/0130723 A1 | 4/2023 | Osterhout et al. | | |
| 2023/0186493 A1 * | 6/2023 | Lee | H04N 23/69 | |
| | | | 348/139 | |

FOREIGN PATENT DOCUMENTS

| | | | |
|---|---|---|---|
| KR | 10-2018-0056182 A | 5/2018 | |
| KR | 10-1915269 A | 11/2018 | |
| KR | 10-1929846 A | 12/2018 | |

OTHER PUBLICATIONS

Notice of Allowance mailed on Mar. 2, 2026 from Korean Patent Office for Korean Application No. 10-2023-0065453.

* cited by examiner

10

RANGE FINDER FOR AUTOMATICALLY SETTING CAMERA ZOOM MAGNIFICATION

CROSS-REFERENCE TO RELATED APPLICATION(S)

This application claims priority from Korean Patent Application No. 10-2023-0065453, filed on May 22, 2023 in the Korean Intellectual Property Office, the disclosure of which is incorporated herein by reference in its entirety.

BACKGROUND

1. Field

The following description relates to a range finder, and more specifically, to a range finder in which a global positioning system (GPS) method and a laser method are combined to measure a distance to a target.

2. Description of Related Art

In distance measurement technologies, there are a global positioning system (GPS) method of measuring a distance between a range finder and a target using map data and a GPS sensor, a laser method of measuring a time between a time at which a laser is projected to a measurement target and a time at which the laser is reflected by and returned from the target, and the like.

Range finders using the above-described technologies are used for various fields, and particularly, frequently used for measuring a distance to a target point to which a golf ball flies in golf. In the conventional golf range finder, there are a range finder using a GPS method, a range finder using a laser method, a range finder of a hybrid method in the combination of a GPS method and a laser method, and the like.

A range finder using a GPS method, there are products which show a distance on a display screen or provides voice guidance through a sound using a device in which a GPS module or chip is embedded. The range finder using the GPS method stores required coordinates of locations in all golf courses in an internal memory of the product in advance and uses map data corresponding to a golf course in real golf courses. The range finder using the GPS method measures a distance to a target object through a method of calculating the distance by calculating a position of a player using signal information received from satellites in real time and obtaining location coordinates of a designated location of the target object from the map data.

In a range finder using a laser method, there is a method of measuring a distance by projecting a laser output from a laser diode, receiving the laser reflected by and returned from a target object, and calculating the distance using a moving speed and a received time. A player measures the distance by accurately aiming at the target object using the range finder using the laser method.

A range finder using a hybrid method may use both a GPS method and a laser method. The range finder using the hybrid method displays a golf course and a distance calculated using the GPS on a liquid crystal display (LCD) attached to a front or side surface of the range finder. A player refers and uses the distance measured through the GPS method, and then as necessary, measures and uses a distance to the target object using the laser method with a low error rate.

In the range finder using the laser method and the range finder using the hybrid method that use a laser, the accuracy of distance measurement is high, but frequent manipulation (for example, zoom magnification setting, target aiming, button manipulation for measurement, and the like) is required for accurate measurement, and thus there is a problem of low concentration of a player.

SUMMARY

Embodiments of the present invention are directed to providing a range finder capable of automatically setting a zoom magnification of a camera on the basis of a distance to a target obtained using a global positioning system (GPS).

In addition, embodiments of the present invention are also directed to providing a range finder capable of recognizing a target from a preview image captured by a camera using an artificial intelligence technology.

In addition, embodiments of the present invention are also directed to providing a range finder capable of automatically measuring a distance to a target by projecting a laser when a target is recognized from a preview image.

In one aspect of the present invention, a range finder, which is capable of automatically setting a camera zoom magnification, includes a camera part, a global positioning system (GPS) receiver, a distance calculator, a controller, and a distance measurement part.

The camera part includes one or more camera modules having an optical zoom function and captures an image of a target.

The GPS receiver receives GPS signals and extracts current location information.

The distance calculator calculates a distance to the target using location information of the target on stored map data and the current location information.

The controller determines and sets an optical zoom magnification of the camera module on the basis of the calculated distance to the target.

The distance measurement part measures a distance to the target using a laser.

In an additional aspect of the present invention, the range finder may further include a display.

The display may display a preview image captured by the camera part at the set zoom magnification. In addition, the display may display the preview image on an entire display region and display a map image, which is related to the current location information, to be overlaid with the preview image at one side of the display region.

In another aspect of the present invention, a camera part may provide a digital zoom function, and a controller may set a zoom by combining an optical zoom magnification and a digital zoom magnification.

In an additional aspect of the present invention, the range finder may further include a target recognizer.

The target recognizer may recognize a target from a preview image captured by a camera part at a set zoom magnification.

In this case, when the target recognizer recognizes the target from the preview image, a controller controls a distance measurement part to measure a distance to the target.

DETAILED DESCRIPTION

The above-described and additional aspects of the present invention will be realized from embodiments described with reference to the accompanying drawings. It is understood that components in the embodiments may be variously combined in one embodiment as long as there are no contradictory statements therebetween. Although a block of a block diagram may denote a physical component in some cases, the block may denote a partial function of one physical component or may logically denote a function performed by a plurality of components in other cases. In some cases, the substance of a block or a part of the block may be a set of program commands. Some or all blocks may be implemented as hardware, software, or a combination thereof.

In the present invention, a camera module may include an image sensor, a lens, and a lens barrel and may be a camera module including a zoom lens for a zoom function. In addition, in the present invention, a camera is referred to as a camera module included in a range finder of the present invention.

Figure 1:
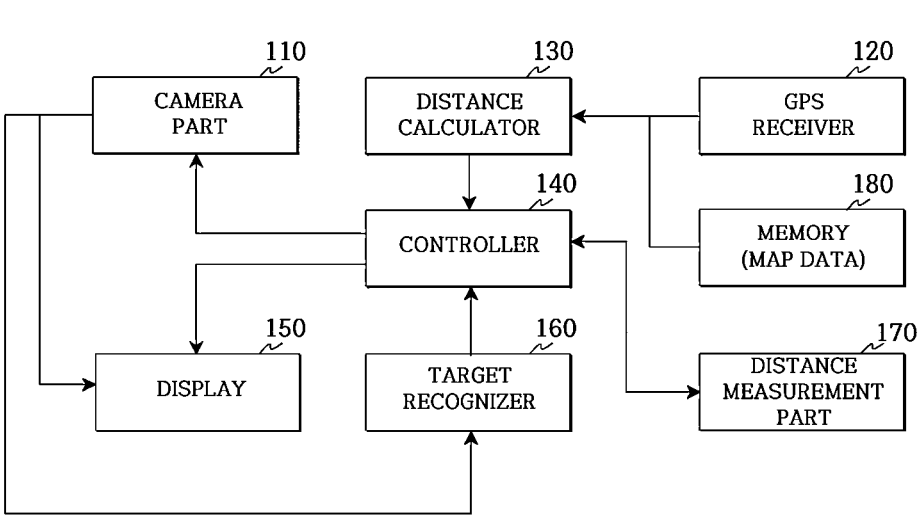
FIG. 1 is a block diagram illustrating a range finder of the present invention.

FIG. 1 is a block diagram illustrating a range finder of the present invention. A range finder 10 according to one aspect of the present invention is a range finder capable of automatically setting a camera zoom magnification and includes a camera part 110, a global positioning system (GPS) receiver 120, a distance calculator 130, a controller 140, and a distance measurement part 170.

The range finder 10 may include an application processor (AP), and at least some functions of functional blocks of the range finder 10 may be implemented as a program command set which is executed by the corresponding processor.

The camera part 110 includes one or more camera modules having an optical zoom function to capture an image of a target. A region of which an image is captured by the camera part 110 is a region including a point, that is, the target, to which a laser of the distance measurement part 170 is projected. The camera part 110 includes one or more camera modules, and any one camera module of the camera modules has an optical zoom function. As an example, when the camera part 110 of the range finder 10 includes two camera modules, one camera module provides a zoom function, or both two camera modules provide zoom functions to provide linearly different zoom magnification ranges.

In some aspects of the present invention, the camera part 110 may further include a viewfinder (not shown). Accordingly, a user may check an image, that is, a preview image, captured using the viewfinder.

The GPS receiver 120 receives GPS signals sent by GPS satellites and extracts current location information. The location information extracted by the GPS receiver 120 from the GPS signals may be coordinate information which is latitude and longitude Information. Although the present invention uses the GPS as a global navigation satellite systems (GNSS), the GPS may be replaced with another GNSS such as Galileo, GLONASS, BeiDou QZSS, IRNSS, or the like.

Map data including data of a region to which a distance measurement target belongs is downloaded and stored in a memory 180 in advance. As an example, when the range finder 10 of the present invention is a golf range finder, course maps of golf courses are stored as map data in the memory 180. The map data includes coordinate information, that is, latitude and longitude Information, for each point on the maps.

The distance calculator 130 calculates a distance to a target using location information of the target on map data and current location information. The distance calculator 130 calculates a distance between two points using current location information, that is, coordinate information, of the range finder 10 extracted from GPS signals and location information, that is, coordinate information, of a target on map data. When the coordinate information is latitude and longitude values, the distance calculator 130 may calculate the distance between two points using the Haversine formula. However, a method of calculating a distance between two points is not limited thereto. In this case, when location information includes altitude information, the distance calculator 130 may calculate a distance between two points by reflecting an altitude difference.

The controller 140 determines and sets an optical zoom magnification of a lens of the camera module on the basis of a distance to a target calculated using the distance calculator 130. Generally, a user checks a preview image and sets a zoom magnification for easy target aiming. When the user determines a long distance to the target, a high magnification zoom may be set, and in the case of a short distance to the target, a low magnification zoom may be set, or a zoom may not be set. Although the user may directly set a zoom as described above in the present invention, the controller 140 automatically sets a zoom magnification according to a distance to a target. That is, the controller 140 determines a zoom magnification optimized for measuring a distance using a laser according to the distance to a target and then controls the camera part 110 to set the corresponding zoom magnification. For example, when the present invention relates to a golf range finder and a remaining distance to a target is calculated as 120 m, in a case in which eight times zoom is proper, even when the user does not set a zoom, the range finder 10 automatically sets the eight times zoom.

In this case, the remaining distance and zoom magnification may be defined and stored in the memory 180 in advance. For example, when the range finder 10 operates up to ten times zoom, it may be defined in advance to automatically set three times zoom at 50 m or less, six times zoom at from 51 m to 100 m, eight times zoom at from 101 m to 150 m, nine times zoom at from 151 m to 200 m, and ten times zoom at 200 m or more.

According to the aspect of the present invention, the controller 140 may determine a zoom magnification to have a constant ratio of a size of a boundary box including a target occupied in the preview image.

The distance measurement part 170 measures a distance to a target using a laser. The distance measurement part 170 includes a laser transmitter which projects a laser signal and a laser receiver which receives a signal reflected by and returned from the target. When the user aims at a target from a preview image captured at a set zoom magnification and presses a button for measuring a distance, the distance measurement part 170 projects a laser toward the target using the laser transmitter and receives the laser reflected by the target using the laser receiver to calculate a distance to the target. That is, when the distance measurement part 170 receives the laser projected by the laser transmitter and reflected by and returned form the target, the distance measurement part 170 measures the distance to the target using a moving speed and laser beam transmitting and receiving times.

A range finder according to another aspect of the present invention may further include a display 150.

The display 150 visually provides a preview image captured using a camera part 110 and text for providing additional information for the corresponding image. Particularly, the display 150 displays a preview image captured by the camera part 110 at a set zoom magnification.

A user tries to measure a distance to a target by aiming at the target while viewing an image displayed on the display 150.

In addition, the display 150 may display a preview image on an entire display region and display a map image related to current location information to be overlaid therewith on one side of the display region. As an example, when a range finder 10 of the present invention is a golf range finder, the range finder may display a camera preview on an entire display region, that is, an entire screen, of the display 150, and a GPS course map for each hole may be displayed to be translucently overlaid with the camera preview on one side (for example, a left side) of the screen.

According to still another aspect of the present invention, a camera part 110 may provide a digital zoom function, and a controller 140 may set a zoom by combining an optical zoom magnification and a digital zoom magnification. A range finder 10 of the present invention may combine an optical zoom of the camera part 110 and a digital zoom provided using an image signal processor (ISP) to provide a zoom function with a wider zoom range. As an example, the range finder 10 of the present invention may set a ten 20) times zoom magnification by setting an optical five times zoom and a digital two times zoom. The ISP may be provided as a separate chip of the camera part 110 and provided to be included in an AP which is a system on chip (SoC) of the range finder 10.

A range finder 10 according to yet another aspect of the present invention may further include a target recognizer 160.

The target recognizer 160 recognizes a target from a preview image captured by a camera part 110 at a set zoom magnification. The target recognizer 160 includes a trained machine learning model. The machine learning model included in the target recognizer 160 may be a convolution neural network (CNN) specialized for image processing or an object recognition model based on the CNN. For example, the machine learning model may be You Only Look Once (YOLO), Regions with CNNs (R-CNN), Faster R-CNN, or the like. However, the present invention is not limited thereto. The target recognizer 160 uses a machine learning model trained in advance using a training data image set including data of a target of which a distance from the range finder 10 should be measured. The target recognizer 160 may try to recognize a target when the target is located around a center of a preview image to facilitate measuring a distance to the target using a laser. To this end, a display 150 may display an indication mark, which allows a center of a screen to be recognized, on the preview image to be overlaid with the preview image.

When the target recognizer 160 recognizes a target from a preview image, a controller 140 controls a distance measurement part 170 to measure a distance to the automatically recognized target even when a user does not manipulate a button for measuring a distance to a target. The distance measurement part 170 which receives a control command from the controller 140 projects a laser beam using a laser transmitter and receives the laser beam reflected by the target using a laser receiver to calculate the 20 distance to the target similarly to a case in which a measurement button is pressed.

The measured distance is displayed as text on a predetermined region of the display 150.

Figure 2:
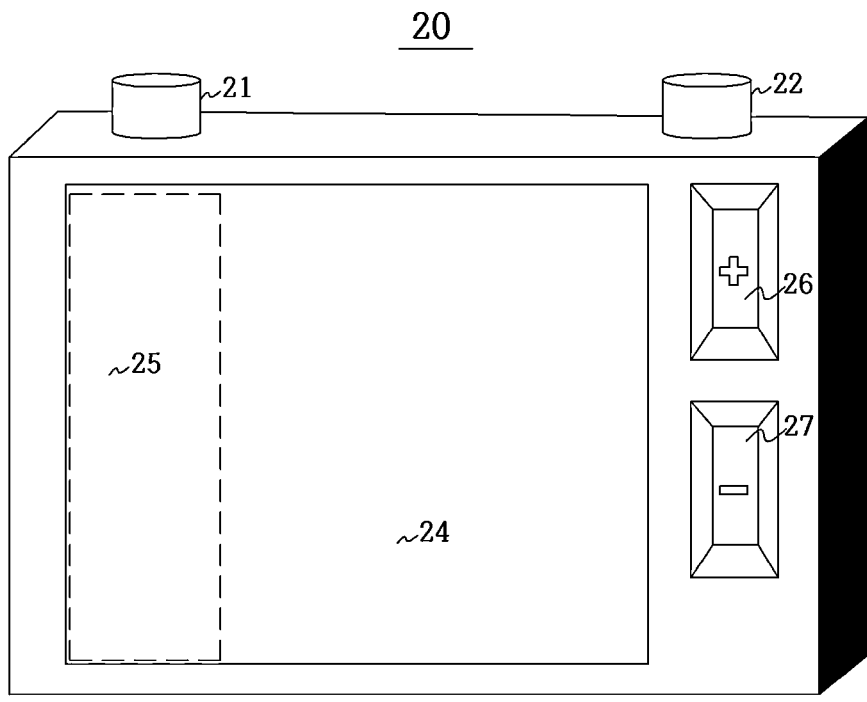
FIG. 2 is a schematic view illustrating a front portion of the range finder according to one embodiment of the present invention.
Figure 3:
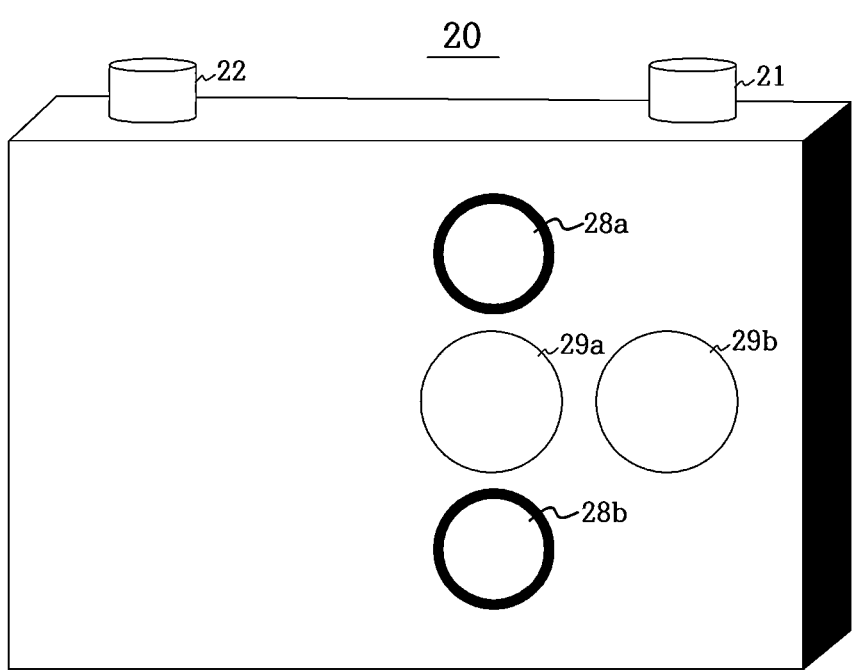
FIG. 3 is a schematic view illustrating a rear portion of the range finder according to one embodiment of the present invention.

One example of the range finder of the present invention is a golf range finder. FIG. 2 is a schematic view illustrating a front portion of the range finder according to one embodiment of the present invention, and FIG. 3 is a schematic view illustrating a rear portion of the range finder according to one embodiment of the present invention.

The best exemplary example of the range finder of the present invention is a golf range finder 20. FIGS. 2 and 3 are conceptual views illustrating an exterior of the golf range finder 20, and components of the range finder are not limited to those in the drawings, and a shape of a product or locations of the components are not limited to those in the drawings.

For the sake of convenience in the description, a surface on which a display 24 is disposed is referred to as a front portion, and a surface on which cameras 28a and 28b and laser transceivers 29a and 29b are disposed is referred to as a rear surface.

Preferably, the large display 24 may be disposed on the front portion of the golf range finder 20. A preview image captured by a user using the cameras 28a and 28b, golf course map information, a mark allowing easy targeting, and text information showing a distance and the like are displayed on the display 24. A course map display part 25 may be displayed to be overlaid with the preview image at one side region of the corresponding display.

In the example illustrated in FIG. 2, buttons 26 and 27 capable of adjusting a zoom magnification are disposed on the front portion. The user may manually change setting of a zoom magnification using the buttons 26 and 27. Even when the range finder 20 of the present invention automatically sets a zoom magnification on the basis of a distance calculated using the GPS, the user may also adjust the zoom magnification setting using the corresponding buttons 26 and 27. Accordingly, the user may set a desired magnification by minimally adjusting a magnification (for example, eight times magnification), which is set by the range finder 20 on the basis of a distance, without manually setting from a low magnification (for example, one times magnification) to a high magnification (for example, ten times magnification).

Lenses of a plurality of the camera modules 28a and 28b, a laser transmitter 29a, and a laser receiver 29b are disposed on the rear portion of the golf range finder 20 of FIG. 3. In an example of FIG. 3, two camera modules 28a and 28b are illustrated, and both two camera modules 28a and 28b have optical zoom functions, or one camera module 28a or 28b has an optical zoom function. For example, a camera module1 28a is used when a video or photo image is captured, and a camera module2 28b may support an optical zoom. As another example, the camera module1 28a may support an optical zoom of one to three times, and the camera module2 28b may support an optical zoom of four to ten times. A zoom magnification to be implemented may be supported by changing a configuration of the camera modules.

In a case in which the golf range finder 20 illustrated in FIGS. 2 and 3 uses both two camera modules 28a and 28b to support ten times zoom, when the golf range finder 20 is set to operate at three times zoom at 50 m or less, at six times zoom at from 51 m to 100 m, at eight times zoom at from 101 m to 150 m, at nine times zoom at from 151 m to 200 m, and ten times zoom at 200 m or more in advance, a corresponding magnification may be automatically set according to a distance calculated using the GPS, and the user may use the automatically set magnification or change the zoom magnification through additional adjustment.

In the example illustrated in FIGS. 2 and 3, a power button 21 and a measurement button 22 are additionally disposed, and additional components for setting other functions may be added as necessary.

As another example of the present invention, the range finder may be used as a measurement device in road construction or bridge construction and used as a device in a vehicle for measuring a distance to an obstacle during traveling. An example of the present invention is not limited thereto and may be applied to and used in any field requiring measurement of a distance to a target on the basis of a distance using the GPS.

Figure 4:
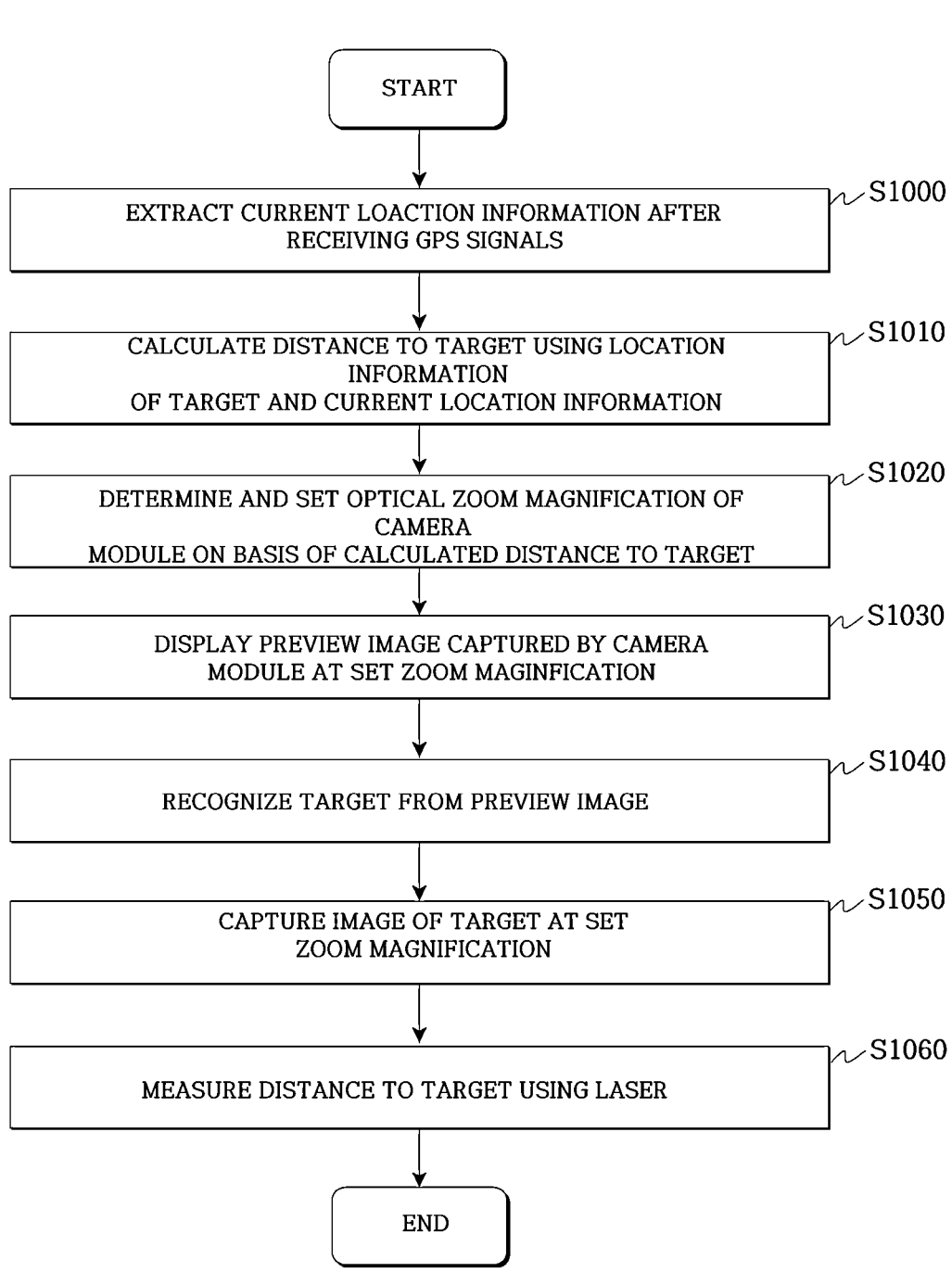
FIG. 4 is a flowchart illustrating a procedure of a method of measuring a distance according to one embodiment of the present invention.

FIG. 4 is a flowchart illustrating a procedure of a method of measuring a distance according to one embodiment of the present invention. A method of measuring a distance according to one embodiment of the present invention is a method in which a range finder 10 capable of automatically setting a camera zoom magnification measures a distance and which includes a GPS reception operation, a distance calculating operation, a zoom setting operation, a target image capturing operation, and a distance measuring operation.

The range finder 10 may include an AP, and some functions of each operation of the method of measuring a distance may be implemented as a program command set which is executed by the corresponding processor.

The GPS reception operation is an operation of extracting current location information after receiving GPS signals sent by GPS satellites (S1000). The location information extracted from the GPS signals received by the range finder 10 may be coordinate information, that is, latitude and longitude Information. Although the present invention uses the GPS as a GNSS, the GPS may be replaced with another GNSS such as Galileo, GLONASS, BeiDou QZSS, IRNSS, or the like.

Map data including data of a region to which a distance measurement target belongs is downloaded and stored in the range finder 10. As an example, when the range finder 10 of the present invention is a golf range finder, course maps of golf courses are stored as map data in a corresponding component. The map data includes coordinate information, that is, latitude and longitude Information, for each point on the maps.

The distance calculating operation is an operation of calculating a distance to the target using location information of the target in the stored map data and current location information (S1010). The range finder 10 calculates the distance between two points using the current location information, that is, coordinate information, extracted from GPS signals and the location information, that is, the coordinate information, of the target on the map data. When the coordinate information is latitude and longitude values, the range finder 10 may calculate the distance between two points using the Haversine formula. However, a method of calculating a distance between two points is not limited thereto. In this case, when the location information includes altitude information, the range finder 10 may calculate a distance between two points by reflecting an altitude difference.

The zoom setting operation is an operation of determining and setting an optical zoom magnification of a camera module on the basis of the calculated distance to the target (S1020). Generally, a user checks a preview image and sets a zoom magnification for easy target aiming. When the user determines a long distance to the target, a high magnification zoom may be set, and in the case of a short distance to the target, a low magnification zoom may be set, or a zoom may not be set. The range finder 10 automatically sets a zoom magnification according to the distance to the target. That is, the range finder 10 determines a zoom magnification optimized for measuring the distance using a laser according to the distance to the target and then sets the optimized zoom magnification as a zoom magnification of the camera module.

In this case, a zoom magnification for a remaining distance may be defined and stored in advance. For example, when the range finder 10 operates up to ten times zoom, it may be defined in advance to automatically set three times zoom at 50 m or less, six times zoom at from 51 m to 100 m, eight times zoom at from 101 m to 150 m, nine times zoom at from 151 m to 200 m, and ten times zoom at 200 m or more.

According to an aspect of the present invention, in the zoom magnification setting operation, the range finder 10 may determine a zoom magnification so that a ratio of a size of a boundary box including the target occupied in the preview image is constant.

The target image capturing operation is an operation of capturing an image of the target at the zoom magnification set using the one or more camera modules having optical zoom functions (S1050). A region of which the image is captured by the range finder 10 is a region including a point, that is, the target, to which the laser is projected. The range finder 10 includes one or more camera modules, and any one camera module of the camera modules has an optical zoom function.

The distance measuring operation is an operation of measuring a distance to the target using the laser (S1060). The range finder 10 includes a laser transmitter which projects a laser signal and a laser receiver which receives the signal reflected by and returned from a target. When the user aims at a target from a preview image captured at a set zoom magnification and presses a button for measuring a distance, the range finder 10 projects a laser toward the target using the laser transmitter and receives the laser reflected by the target using the laser receiver to calculate a distance to the target.

A method of measuring a distance according to an additional aspect of the present invention may further include a display operation.

A range finder 10 visually provides a preview image captured using a camera module and text for providing additional information for the corresponding image. The display operation is an operation of displaying a preview image captured by the camera module at a set zoom magnification (S1030).

A user tries to measure a distance to a target by aiming at the target while viewing an image displayed on a display.

In addition, in the display operation, the range finder 10 may display the preview image on an entire display region and display a map image related to current location information to be overlaid therewith on one side of the display region. As an example, when the range finder 10 of the present invention is a golf range finder, the range finder 10 may display a camera preview on the entire display region, that is, an entire screen, of the display, and a GPS course map for each hole may be displayed to be translucently overlaid with the camera preview on one side (for example, a left side) of the screen.

According to yet another aspect of the present invention, in a zoom setting operation, a range finder 10 may provide a digital zoom function. In this case, the range finder 10 may set a zoom by combining an optical zoom magnification and a digital zoom magnification. The range finder 10 may combine an optical zoom and a digital zoom provided using an image signal processor (ISP) to provide a zoom function with a wider zoom range.

A method of measuring a distance according to an additional aspect of the present invention may further include a target recognizing operation.

The target recognizing operation is an operation of recognizing a target from a preview image captured by a camera module at a set zoom magnification (S1040). The range finder 10 includes a trained machine learning model. The machine learning model included in the range finder 10 may be a convolution neural network (CNN) specialized for image processing or an object recognition model based on the CNN. For example, the machine learning model may be YOLO, R-CNN, Faster R-CNN, or the like. However, the present invention is not limited thereto. The range finder 10 trains the machine learning model in advance using a training data image set including data of a target of which a distance should be measured.

In the target recognizing operation, when the target is recognized from the preview image, the range finder 10 may automatically measure the distance to the target automatically recognized even when a user does not manipulate a button for measuring a distance to a target. In this case, the range finder 10 projects a laser beam using a laser transmitter and receives the laser beam reflected by the target using a laser receiver to calculate the distance to the target similarly to a case in which a measurement button is pressed.

The measured distance is displayed as text in a predetermined region of a display.

According to the present invention, a zoom magnification of a camera can be automatically set on the basis of a distance to a target.

In addition, according to the present invention, a target can be automatically recognized from a preview image captured by a camera using an artificial intelligence technology.

In addition, according to the present invention, a distance to a target can be automatically measured by projecting a laser without manipulation of a user when the target is recognized from a preview image.

Although the present invention has been described above with reference to the embodiments and accompanying drawings, the present invention is not limited thereto and should be construed as encompassing various modifications which may be clearly derived therefrom by those skilled the art. The claims are intended to encompass the various modifications.

What is claimed is:

1. A range finder for automatically setting a camera zoom magnification, the range finder comprising:
an application processor;
a camera which captures an image of a target through one or more camera modules that include an image sensor, a zoom lens, and a lens barrel and provide an optical zoom function;
a global positioning system (GPS) receiver which receives GPS signals and extracts current location information;

a memory storing map data and program instructions, wherein the application processor is configured to execute the program instructions to:
calculate a distance to the target using location information of the target on the stored map data and the current location information;
determine an optical zoom magnification of the camera module based on the calculated distance to the target and set a zoom magnification of the camera module; and
aim at the target in an image captured at the set zoom magnification and measure a distance to the target using a laser.

2. The range finder of claim 1, further comprising a display which displays a preview image captured by the camera at the set zoom magnification.

3. The range finder of claim 2, wherein the display displays the preview image on an entire display region and displays a map image, which is related to the current location information, to be overlaid with the preview image at one side of the display region.

4. The range finder of claim 1, wherein:
the camera provides a digital zoom function; and
the application processor sets a zoom by combining an optical zoom magnification and a digital zoom magnification.

5. The range finder of claim 1, wherein the application processor is further configured to execute program instructions to recognize the target from a preview image captured by the camera at the set zoom magnification.

6. The range finder of claim 5, wherein the application processor is configured to automatically measure the distance to the target when the target is recognized from the preview image.

7. A method of measuring a distance by automatically setting a camera zoom magnification, which is performed by a range finder, the method comprising:
a global positioning system (GPS) reception operation of receiving GPS signals and extracting current location information
a distance calculating operation of calculating a distance to a target using location information of the target on stored map data and the current location information;
a zoom setting operation of determining and setting an optical zoom magnification of a camera module on the basis of the calculated distance to the target and setting a zoom magnification of the camera module;
a target image capturing operation of capturing an image of the target using one or more camera modules at the automatically set optical zoom magnification; and
a distance measuring operation of measuring a distance to the target using a laser.

8. The method of claim 7, further comprising a display operation of displaying a preview image captured by the camera module at the set zoom magnification.

9. The method of claim 8, wherein the display operation includes displaying the preview image on an entire display region and displaying a map image, which is related to the current location information, to be overlaid with the preview image at one side of the display.

10. The method of claim 7, wherein the zoom setting operation includes setting a zoom by combining the optical zoom magnification and a digital zoom magnification.

11. The method of claim 7, further comprising a target recognizing operation of recognizing the target from a preview image captured by the camera module at the set zoom magnification.

* * * * *